United States Patent [19]

Chang et al.

[11] Patent Number: 5,405,680
[45] Date of Patent: Apr. 11, 1995

[54] SELECTIVE EMISSIVITY COATINGS FOR INTERIOR TEMPERATURE REDUCTION OF AN ENCLOSURE

[75] Inventors: David B. Chang, Tustin; Slava A. Pollack, Palos Verdes Estate; I-Fu Shih, Los Alamitos; Albert J. Jicha, Torrance, all of Calif.

[73] Assignee: Hughes Aircraft Company, Los Angeles, Calif.

[21] Appl. No.: 263,151

[22] Filed: Jun. 16, 1994

Related U.S. Application Data

[63] Continuation of Ser. No. 513,146, Apr. 23, 1990, abandoned.

[51] Int. Cl.[6] .................................................. C23C 14/06
[52] U.S. Cl. .................................. 428/212; 359/359; 359/580; 359/581; 359/582; 359/589; 428/34; 428/404; 428/432; 428/426; 428/658; 428/913
[58] Field of Search ............... 428/212, 432, 426, 698, 428/446, 913, 404, 34; 359/359, 580, 581, 582, 589

[56] References Cited

U.S. PATENT DOCUMENTS

| | | | |
|---|---|---|---|
| 3,619,235 | 9/1971 | Furuuchi | 428/434 |
| 3,885,855 | 5/1975 | Gross | 428/427 |
| 3,957,029 | 5/1976 | Nozik et al. | 428/432 |
| 4,002,541 | 1/1977 | Streander | 428/331 |
| 4,082,413 | 4/1978 | Austin et al. | 350/166 |
| 4,098,956 | 7/1978 | Blickensderfer et al. | 428/469 |
| 4,286,009 | 8/1981 | Griest | 428/701 |
| 4,302,068 | 11/1981 | Tyroler | 428/919 |
| 4,308,316 | 12/1981 | Gordon | 428/698 |
| 4,323,619 | 4/1982 | Silvestrini et al. | 428/913 |
| 4,337,990 | 7/1982 | Fan et al. | 350/166 |
| 4,381,333 | 4/1983 | Stewart et al. | 350/166 |
| 4,578,527 | 3/1986 | Rancourt et al. | 428/432 |
| 4,600,659 | 7/1986 | Hong et al. | 428/472 |
| 4,628,905 | 12/1986 | Mills | 428/433 |
| 4,668,365 | 5/1987 | Foster et al. | 428/698 |
| 4,769,291 | 9/1988 | Belkind et al. | 428/630 |
| 4,824,730 | 4/1989 | Fukuda et al. | 428/447 |
| 4,832,448 | 5/1989 | Jones | 350/166 |
| 4,850,660 | 7/1989 | Jones et al. | 350/164 |
| 4,887,886 | 12/1989 | Shimizu et al. | 350/166 |
| 4,920,006 | 4/1990 | Gillery | 428/701 |
| 4,968,563 | 11/1990 | Thomas | 428/426 |
| 5,000,528 | 3/1991 | Kawakatsu | 350/166 |

*Primary Examiner*—Archene Turner
*Attorney, Agent, or Firm*—Georgann S. Grunebach; Terje Gudmestad; W. K. Denson-Low

[57] ABSTRACT

Selective emissivity coatings are disclosed for temperature reduction of enclosures such as vehicles and building structures. The coating includes a selective emissivity material such as silicon-oxy-nitride having a desired thermal emissivity function which is high in the 8–13 micron wavelength region, and low elsewhere except in the visible wavelength region. The material provides a mechanism for radiative cooling of the enclosure by converting the blackbody radiation of the enclosure, which would be reflected by the earth's atmosphere, into far infrared radiation which is transmitted by the atmosphere. According to another aspect of the invention, the coating further comprises a semimetal which is reflective of radiation in the near infrared region, thereby reducing the solar heat load on the enclosure. One suitable semimetal is $LaB_6$. The coating may be applied to the exterior surface of vehicle and building windows, or to the exterior, non-window surfaces of building structures. For the latter, the coating may take the form of a conventional paint to which is added tiny particles of the semimetal and selective emissivity materials to achieve the radiative cooling and reflection of incident infrared radiation.

18 Claims, 5 Drawing Sheets

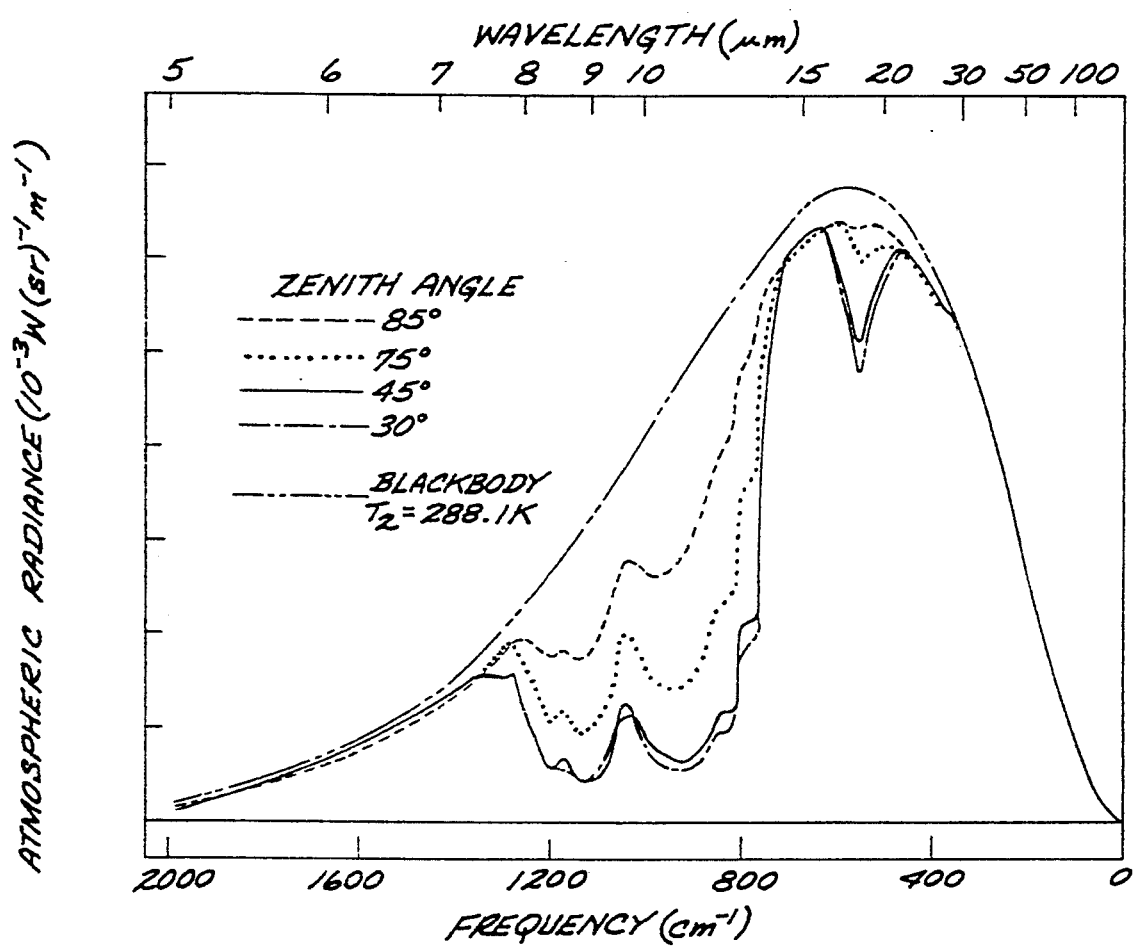
FIG.1
FIG.2
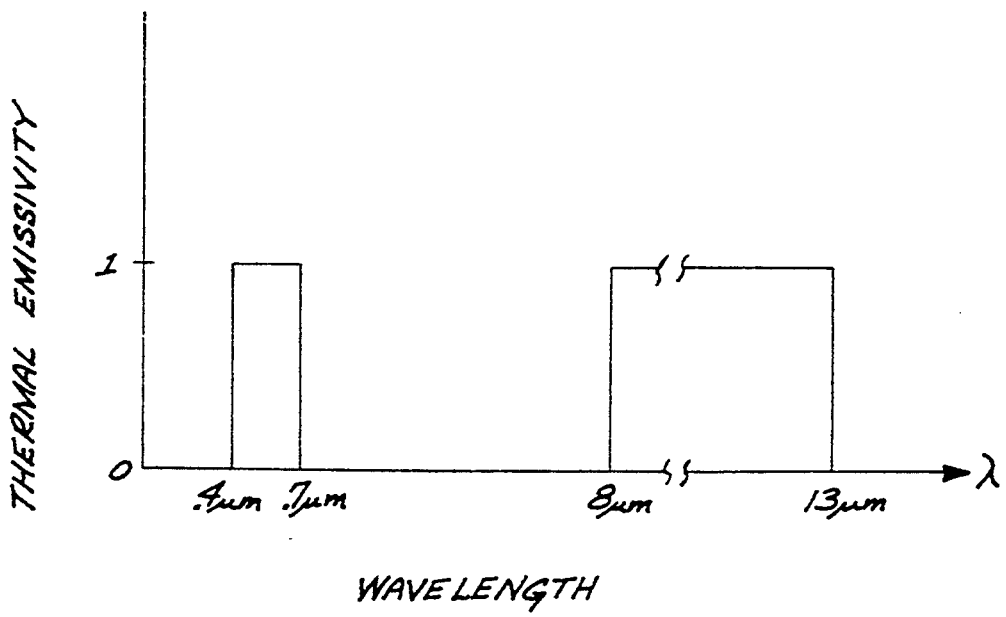

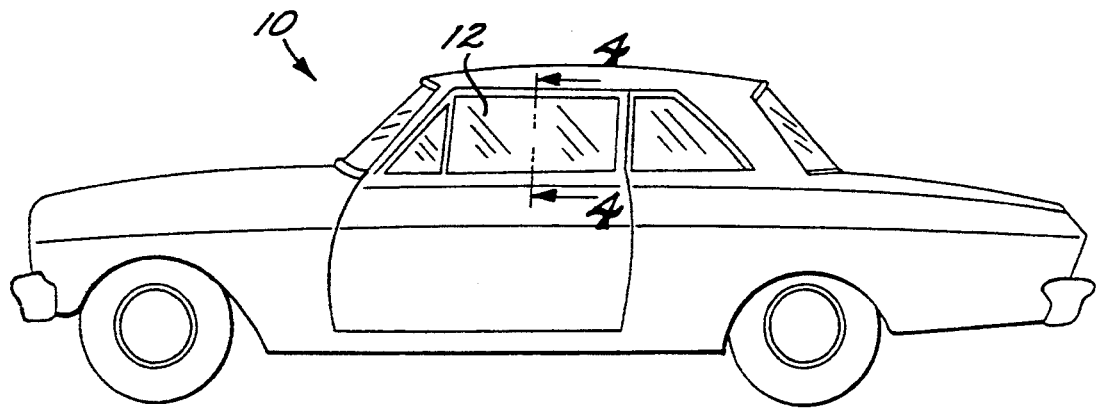
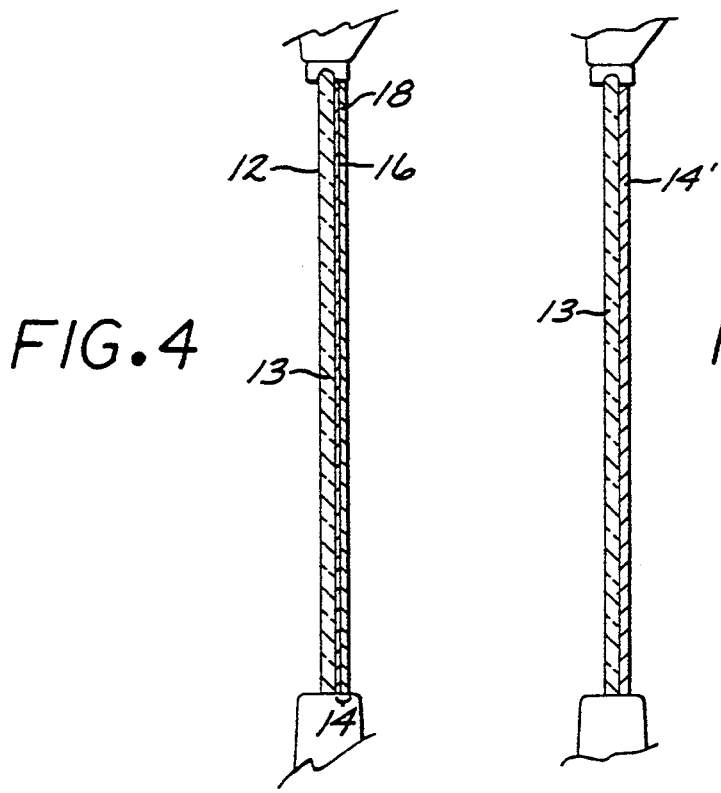

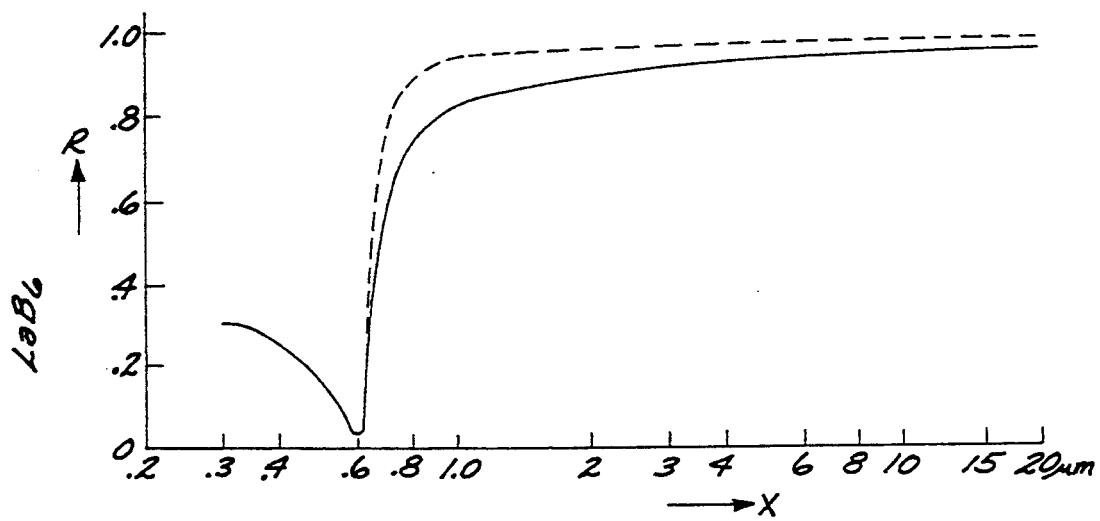
FIG.5
FIG.6
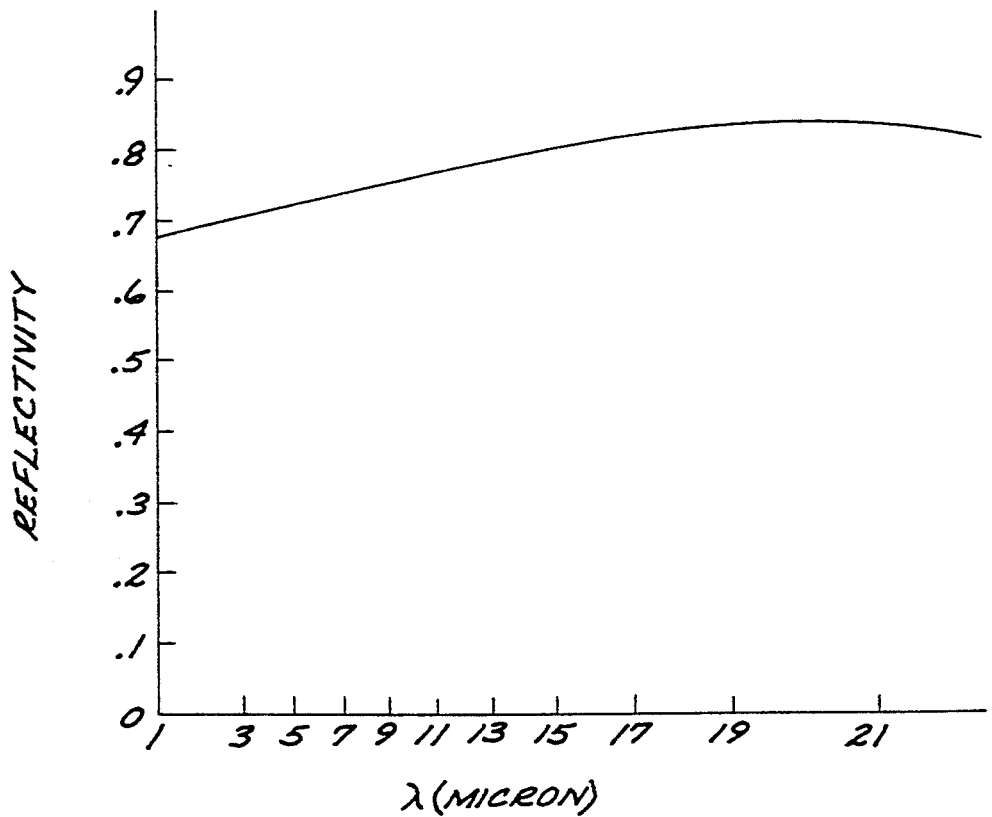

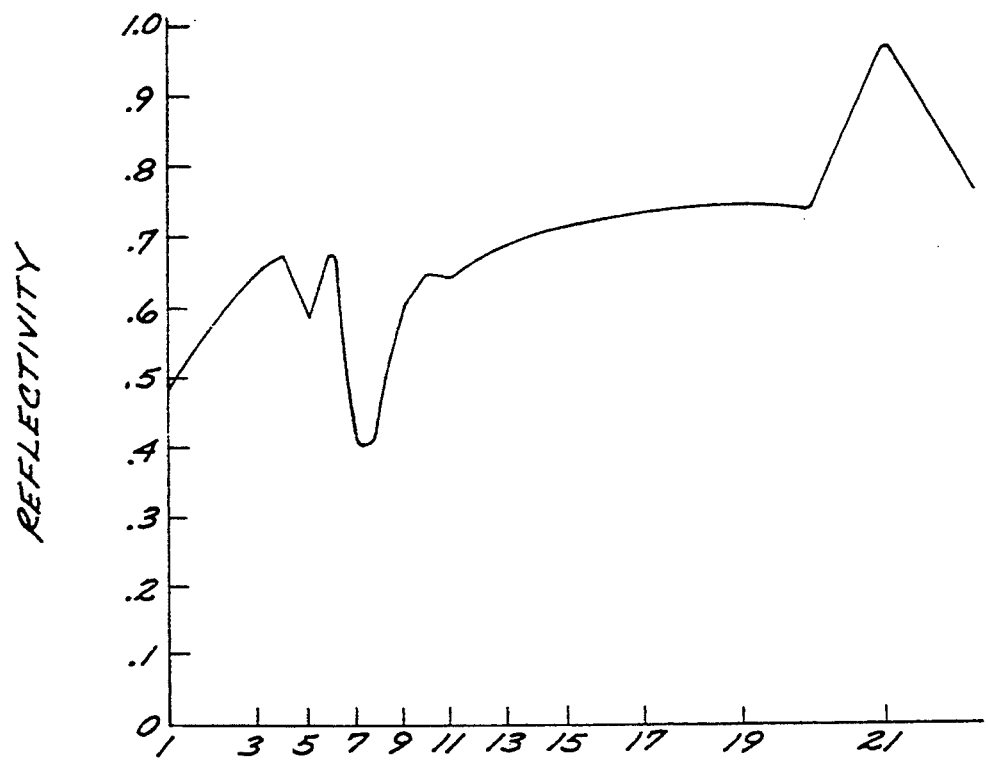
FIG. 7
FIG. 8
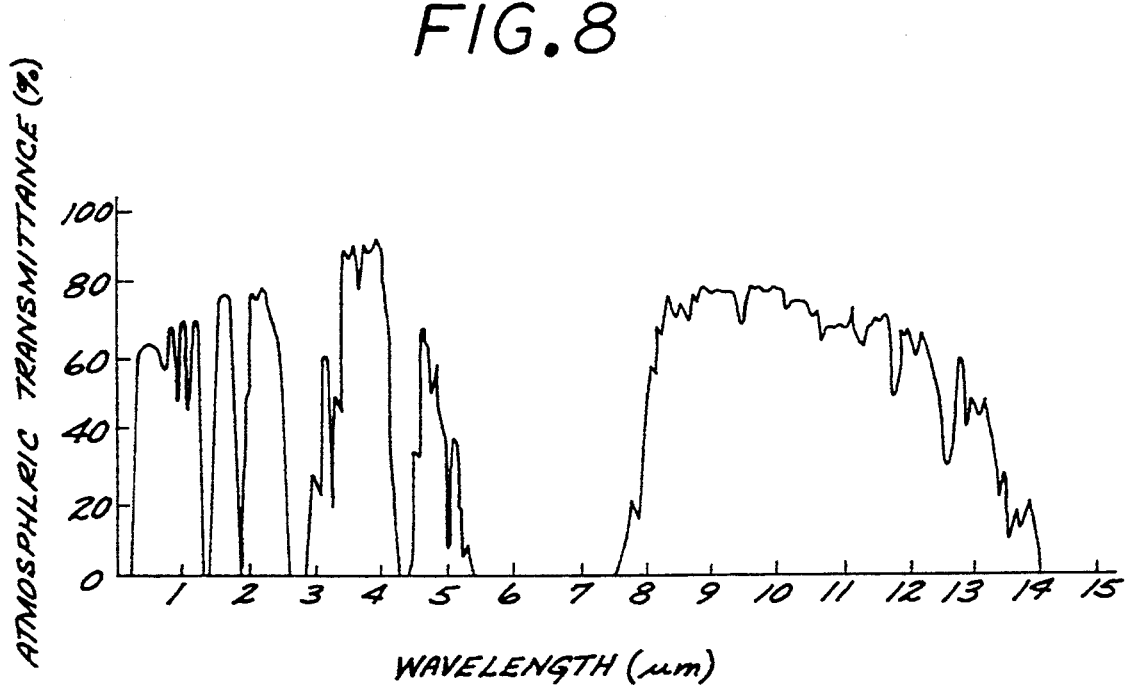

SELECTIVE EMISSIVITY COATINGS FOR INTERIOR TEMPERATURE REDUCTION OF AN ENCLOSURE

This is a continuation of application Ser. No. 513,146, filed Apr. 23, 1990, now abandoned.

BACKGROUND OF THE INVENTION

The present invention relates to the reduction of the interior temperature within an enclosure such as a building or a vehicle which is exposed to solar radiation.

Control of solar heat load is an important problem, particularly to the automobile industry. Absorption of excessive amounts of solar radiation by the vehicle surfaces can result in higher interior temperatures, reduced passenger comfort and amenity, accelerated degradation of interior materials, and increase of the requirement for larger air conditioning units. Under extreme static-soak conditions, which can occur in vehicles parked in the hot summer sun, especially in a desert climate, surface temperature within a closed car can reach over 200° F. and the entire thermal mass of the car can be raised to a high temperature.

Increasing the cooling load of the air conditioning unit to ameliorate heat discomfort would go against the trend currently prevailing in the automobile industry. Automobile engines are being downsized to reduce weight and improve fuel economy and are less able to handle the power drain of the larger air conditioners. A recent concern to industry and Government is the role played by automotive air conditioners as a source of chlorofluorocarbons (CFC) released into the atmosphere; increased cooling load will lead to even larger air conditioning units, which will exacerbate this problem. Thus, there is a need for new technologies and passive design solutions which would lead to reduced solar heat loads and allow reduction of air conditioner size. These cooling alternatives would result in reduced CFC emission and increased vehicle fuel efficiency.

The automobile glazing is by far the most important factor contributing to the heat problem due to excessive solar loading. A standard sedan typically has over 20 square feet of window area and the glass areas of a sports model sedan can exceed 30 square feet. Because of this fact, glazing can be responsible for over 70 percent of the solar thermal load buildup in a parked car. This imposes an additional requirement on the coating, i.e., it should not impair vision through the glazing below the legal limit. The Federal law (American Standard Safety Code 216-1938) requires that all glass in passenger automobiles must transmit 70 percent of the visible light weighted to the illuminating source "A." The source "A" is a blackbody radiating at 1,416° C. (2,581° F.). The spectral output of the blackbody at this temperature is weighted more heavily in the yellow and red regions. Therefore, coatings with high transmission in the green-red region and low transmission, i.e., high reflection, in the ultraviolet-blue and infrared regions could satisfy the legal requirements and, at the same time, control a large portion of solar radiation. It is theoretically possible to reflect 72 percent of the total solar radiation by this approach and still be within the legal glass transmission limits.

To show the effect of glazing, numerical calculations of the interior air temperatures for the standard and sports model sedan simulations were discussed in the paper *"Effects of Glazing and Ventilation Options on Automobile Air Conditioner Size and Performance,"* R. Sullivan and S. Selkovitz, Lawrence Berkeley Laboratories, Sep. 30, 1988. The simulations discussed in the paper covered the course of an entire day under soak conditions in Phoenix, Ariz. The analysis was accomplished using a finite difference heat transfer computer simulation program called ESP. This program was developed to analyze convective, conductive, and radiative heat flow in buildings. The simulation were conducted using weather data for a typical June day with the outside temperature increasing from 27° C. (81° F.) at 8 a.m. to a peak of 40° C. (104° F.) at 6 p.m. The incident solar radiation on a horizontal surface peaked at 3 p.m. at a value of 1,050 $Wm^{-2}$. The results of these calculations present the interior air temperature variations for two models and for four solar transmittances, 83, 43, 23, and 3 percent. A transmission of 83 percent is essentially transmission of a clear glass; solar transmittance of 23 percent is the closest to an ideal coating which would allow 70 percent transmission of the visible light emitted by a 1,416° C. blackbody. It follows from the paper results that use of reflective glazings would provide a substantial reduction in the interior air temperature as the transmittance is decreased.

A solar control coating which transmits only 36 percent of solar radiation, and yet transmits 70 percent of the visible spectrum emitted by the 1,416° C. blackbody, is described in *"Auto Solar Control,"* P. Young and R. Bernardi, SAE 880050 (1988). The developed film is a stack of thin metal and dielectric layers. The metal is highly reflective in the infrared to reflect heat from the sun and the dielectric layers modify transmission characteristics of the film in the visible, to transmit visible light.

Another coating known as "Sungate" is described in *"Sun Stopper,"* Popular Science, October, 1989, at page 66. This coating consists of a stack of metallic and dielectric films sandwiched between two glass plates. The test reported in this article showed that Sungate glass kept the vehicle interior only between 5° and 10° F. cooler than standard glass. The considerable discrepancy in the interior temperature between computer model predictions and actual test values can be attributed to the "greenhouse" effect which builds up slowly due to the absence of radiative cooling. Due to its slow increase, this effect becomes important and affects more the full-day soak interior temperatures than one-hour temperature values.

The inherent limitations of the Sungate-type glass can be understood from the following simple thermal analysis. The visible solar radiation penetrating through the Sungate glass heats the automobile interior to a temperature in the 150°-200° F. range. At these temperatures the interior emits maximum radiation, according to the blackbody law, in the 8 to 10 $\mu$m spectral region. Glass is opaque to this radiation; the glass plate facing the interior fully absorbs this radiation and heats up until its temperature becomes equal to the interior temperature. The interior glass plate cannot dissipate heat radiatively because the path to the outside is blocked by the metallic films comprising the Sungate coating which reflects infrared radiation. Thus, glass can only reradiate heat back into the interior creating the "greenhouse" effect. The only cooling mechanism open to the interior glass is non-radiative through heat conduction to the exterior glass plate. However, conductivity of the metal-dielectric film stack is poor, therefore this mechanism is inefficient. As a result, there is a temperature gradient across the Sungate glass thickness, i.e., the inner surface is hotter than the outer surface.

One approach to reduce the solar heat load of an enclosure (for example, a vehicle or a building) is to coat the outside of the enclosure with reflecting materials which reflect all the solar radiation. However, for the windows of cars or houses, it is definitely not a desirable solution, because then visible light will not be able to pass through the windows. Even for non-window areas, from an esthetic point of view, it is often not desirable to reflect all visible light.

Another known type of control coating is a holographic film which acts as a holographic filter to transmit only the portion of the solar spectrum which is in the visible. The disadvantages of the holographic film are angular dependence, grating effect, and questionable far IR emissivity.

The disadvantage of these films is that they also trap the heat; i.e., the film only slows down the heat build-up, but eventually the heat is trapped inside the enclosure. The visible solar radiation penetrating these films can eventually heat the interior of a vehicle to a temperature in the 150°–200° F. range. At these temperatures, the interior emits maximum radiation, according to the blackbody law, in the 8–10 $\mu$m, spectral region. The interior heat cannot dissipate radiatively because the surfaces will reflect infrared radiation. The only other passive cooling mechanism is through conduction. However, most building materials are poor thermal conductors. As a result, the inner surface is hotter than the outside surface.

Similar problems and considerations apply to enclosed building structures. Such structures can be heated by solar radiation to an extent that occupants are uncomfortable, leading to increased use of energy to cool the structure interior.

It is therefore an object of the present invention to provide a radiative cooling means for reducing the temperature inside an enclosure which is exposed to solar radiation.

A further object is to provide a coating which reflects incident solar radiation in the infrared, and yet permits heat within the enclosure to be reradiated to the atmosphere as infrared radiation in the 8–13 $\mu$m range.

SUMMARY OF THE INVENTION

In accordance with the invention, a selective emissivity coating is provided for interior temperature reduction of an enclosure. The coating comprises a selective emissivity material characterized by high thermal emissivity in the 8–13 $\mu$m wavelength region. The material provides a means for radiating to the atmosphere the radiation emitted within the enclosure. The invention exploits the wavelength selective property of the earth's atmosphere, which readily transmits energy in the 8–13 $\mu$m wavelength region. Exemplary selective emissivity materials suitable for the purpose include silicon-oxynitride and the heavy metal oxides.

According to another aspect of the invention, the selective emissivity coating further comprises a semimetal which provides a means for reflecting incident solar radiation in the near and mid-infrared wavelength regions. $LaB_6$ is an exemplary suitable semimetal. Such a material serves to reduce the solar heat load by reflecting the incident solar infrared radiation.

One coating embodiment of the invention comprises a first thin film coating of a semimetal, to which is applied an overcoating of a thin film of the selective emissivity material. The coating is applied to a surface of a vehicle or building window, or the exterior surface of another building structural element. The semimetal film provides a means for reflecting incident solar radiation while transmitting visible light energy. The selective emissivity material provides a means for efficiently radiating infrared radiation in the 8–13 $\mu$m range, thereby cooling the enclosure interior via radiation.

In another preferred embodiment, the semimetal and selective emissivity material are applied as a single coating, e.g., by dipping the window or structural element in a liquid bath containing in mixed suspension tiny particles of these materials, or by spraying the surface to be coated with a liquid containing the tiny particles.

In a further embodiment, the coating is applied between two laminated singlets comprising a laminated window structure.

The coating can further comprise a paint coating, wherein the semimetal ad selective emissivity material particles are mixed into and suspended within the otherwise conventional paint.

As a further alternate embodiment, the particles of the selective emissivity and semimetal materials are embedded within the glass comprising the window.

In other embodiments, the coating includes the selective emissivity material, yet does not include the semimetal.

BRIEF DESCRIPTION OF THE DRAWINGS

These and other features and advantages of the present invention will become more apparent from the following detailed description of exemplary embodiments thereof, as illustrated in the accompanying drawings, in which:

FIG. 1 is a graphical depiction of the U.S. standard atmospheric radiance and radiance of a blackbody at T=288.1° K. between 5 and 50 $\mu$m.

FIG. 2 is a graph of emissivity versus wavelength, showing an ideal emissivity function of a selective emissivity material employed in a coating according to the present invention.

FIG. 3 is a simplified side view of a vehicle having glazing coatings in accordance with the invention.

FIG. 4 is a cross-sectional view of a vehicle window of FIG. 3, showing the window and coating.

FIG. 5 shows the reflection edge of a thin film made of $LAB_6$, and FIG. 6 shows the film's reflection spectrum in the infrared.

FIG. 7 illustrates the infrared diffuse reflection spectrum of an exemplary coating embodying the invention.

FIG. 8 is a graph showing the atmospheric transmission (%) as a function of wavelength.

FIG. 13 illustrates a coating in accordance with another aspect of the invention, wherein the coating comprises a selective emissivity material, and does not include a semimetal material.

DETAILED DESCRIPTION OF THE PREFERRED EMBODIMENT

Figure 9:
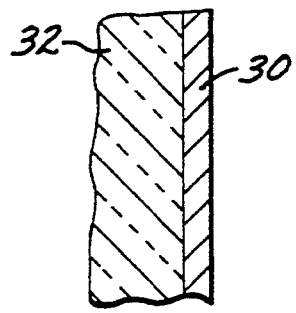
FIG. 9 shows a single layer coating comprising both the semimetal and the selective emissivity material.

Semimetal as used herein means a compound which includes a semimetal element and which reflects incident solar radiation in the near and mid-infrared wavelength regions as discussed below.

The invention relates to a special coating (or paint). When the coating is applied to the outside surfaces of an enclosure, it can reduce the inside temperature of the enclosure.

Radiative cooling is an effective passive means to lower the surface temperature below that of the ambient by making the surface highly emissive in the 8-13 $\mu$m region, i.e., in the region of low atmospheric thermal emission. To avoid the heat-trapping effect (or greenhouse effect) according to the teaching of this invention, coatings with this thermal emissivity property in the 8-13 $\mu$m spectral region are used to effect the radiative cooling mechanism. FIG. 1 shows U.S. standard atmospheric radiance and radiance of a blackbody at T=288.1° K. between 5 and 50 $\mu$m. The areas under the black body and atmospheric radiance curves represent the amount of radiation emitted and received by the blackbody in the infrared region. Since the amount of radiation emitted by the blackbody exposed to the sky exceeds the amount it receives from the sky in the 8 to 20 $\mu$m region, its temperature will drop until equilibrium is established. It can be calculated that for T=288.1° K. the initial radiance difference or the initial cooling power density will mount to 113 W/m².

Consider now a selective thermal radiator characterized by emissivity $\epsilon=1$ between 8 and 13 $\mu$m and $\epsilon=0$ elsewhere, radiating and receiving ambient infrared radiation at T=288.1° K. The initial cooling power density will be slightly less than that for the blackbody, i.e., 93 wm$^{-2}$; however, to establish equilibrium, the selective radiator will drop to lower temperatures than the blackbody.

The radiative cooling power $P_{rad}$ (excess of radiated power over returned power) in the cases of the blackbody and infrared selective surfaces can be determined from eq. 1, representing the net radiative flux which is expressed as a difference between the outgoing and incoming spectral radiances:

$$P_{rad} = \pi \int_0^{\pi/2} d(\sin^2\Theta) \int_0^{\infty} [1 - \rho(\Theta,\lambda)] \quad (1)$$
$$[W_s(\lambda,T_s) - W_a(\Theta,\lambda,T_n)]d\lambda$$

where $\Theta$ represents the angle between the surface normal and the radiation direction, $\rho$ represents the wavelength-and-direction dependent reflectivity, $W_s(\lambda,T_s)$ is the spectral radiant power density of the emitting surface, $W_a(\Theta),t,T_a)$ is the radiance coming from the clear sky, and d denotes the differential element. The first integral in eq. 1 represents hemispherical averaging of surface emittance $\epsilon(\Theta,\lambda)=1 - \rho(\Theta,\lambda)$. The radiative cooling causes a temperature drop $$\Delta T = T_a - T_s$$

From the above discussion, it can be seen that a metal or semi-metal film by itself, due to its negligible emissivity in the 8-13 $\mu$m region, cannot completely solve the problem of reduction of interior heating. Such a film can slow down the heating process, but for longer exposure the film can produce little, if any, temperature reduction. (It is well known, for example, that chrome plated vehicle bumpers exposed for an extended time to sunlight become as hot as the rest of the vehicle body.) To effect radiative cooling, a material with a selective emissivity $\epsilon$, such as $\epsilon \approx 1$ between 8-13 $\mu$m and $\epsilon \approx 0$ elsewhere (except between 0.4-0.7 $\mu$m, to provide for good transmission of visible light, important for windows), can be used. This ideal emissivity characteristic is illustrated in FIG. 2.

Band theory provides a simple explanation of electrical and optical properties of semimetals. The conduction band electron occupancy in semimetals is the result of a slight conduction-valence band overlap. Due to this band arrangement, semimetals, in general, have a larger free-charge carrier concentration than semiconductors. The free-charge carriers in the conduction band are not only responsible for the electrical conductivity, but also give rise to absorption of electromagnetic radiation, characterized by an absorption edge, whose spectral position depends on the free-charge carrier parameters, such as concentration, mobility, effective mass, etc. By varying these parameters, it is possible to adjust the absorption edge wavelength.

In accordance with one aspect of the invention, an improved coating for automobile glazings is provided which will effectively reduce the solar heat load on the automobile interior. The operation of the coating employs, in one aspect, the same principle as the existing coatings, i.e., reflection of solar radiation in excess of 70 percent of the visible radiation corresponding to the emission of 1,416° C. blackbody. However, unlike the existing coatings, the new coating has good thermal conductivity and an efficient emissivity property in the 8-13 $\mu$m region. Thus, the new coating takes advantage of the radiative cooling and effectively controls the interior temperature by radiating the excessive heat to the outside.

First Coating Embodiment

A first embodiment of a coating embodying the invention is for application to window glass or other structural elements exposed to solar radiation. A preferred application is for vehicle window glazings, as illustrated in FIG. 3. Here, the vehicle 10 has several windows, including exemplary window 12. As shown in the cross-sectional view of FIG. 4, a coating 14 is applied to the exterior surface of the window 12 (in practice, the coating will typically be applied to all the vehicle windows). The coating 14 includes a single semimetal film 16 formed on the exterior facing surface 13 of the window. The purpose of dielectric layers in the known coating configurations, such as Sungate glass, is to modify film transparency in the visible. Without dielectrics the metal films would have a mirror-like appearance in the visible because metal reflection edges are usually in the ultraviolet region of the spectrum. Unfortunately, dielectrics affect adversely thermal conductivity of the stack reducing it to a low value.

The wavelengths of semimetal reflection edges, on the other hand, can be adjusted to be in the red or near infrared regions. Thus, a semimetal film can be made transparent in the visible and, at the same time, reflective in the infrared. Reflection edge wavelength selection for the new film 14 is dictated primarily by the considerations of reflecting maximum solar energy compatible with the requirement of 70 percent transmission of the visible portion of the spectrum emitted by the 1,416° C. blackbody. The optimum reflection edge wavelength, thus, should be somewhere between 650 and 700 nm.

There are several known semimetals whose reflection edges fall into 650–800 nm spectral region; among them are some rare earth and other metal borides and chalcogenides, such as $LAB_6$, $LaTe$, and $SbS_3$. FIG. 5 shows the reflection edge of a thin film made of $LaB_6$ and FIG. 6 shows its reflection spectrum in the infrared. The $LaB_6$ thin film exhibits strong reflection through the entire infrared region.

Due to its good thermal conductivity the semimetal film comprising the coating 14 will also serve another important purpose. As previously discussed, the only cooling mechanism open to the automobile glazing overcoated with an infrared reflecting film is through heat conduction to the outermost surface. Because of low emissivity in the infrared, the semimetal film 16 can efficiently conduct heat but not radiate it. In accordance with the teachings of the present invention, the semimetal film is overcoated with another thin film 18 transparent in the visible and emissive in the infrared. To maximize the radiative cooling properties of this film its emissivity should be confined to the 8–13 $\mu$m region.

In order to produce absorption in the 8–13 $\mu$m region necessary for the radiative cooling effect, the $LaB_6$ thin film is coated with a thin film made from a selective emissivity material such as silicon-oxi-nitride (Si-Ox-Ny). The results obtained are shown in FIG. 7 which depicts the infrared diffuse reflection spectrum of $LaB_6$ film overcoated with $SiO_{0.6}N_{0.2}$ film on an aluminum substrate; both films are 0.5 $\mu$m thick. Formation of an absorption band in the right infrared region is clearly visible.

Other selective emissivity materials which may be used are the metal oxides, and particularly the heavy metal oxides, such as zirconium oxide and thorium oxide. Aluminum oxide will work, but not as efficiently as the heavy metal oxides. Since aluminum oxide has high emissivity in the 5 to 10 $\mu$m range, part of the radiated heat will be reflected back from the atmosphere, since the atmosphere is characterized by good transmission properties for radiation in the 1–5 $\mu$m and 8–13 $\mu$m and by poor transmission of radiation in the 5–7 $\mu$m region. (This is shown in FIG. 8.)

It is instructive to compare performance and property similarities and differences between the new automobile glazing coating for reduction of solar heat load and the multilayer films used in the laminated commercially available glasses, such as Sungate glass. Both operate on the same principle, i.e., maximum reflection of solar infrared radiation and transmission of legally required visible radiation. One difference is in the thermal conductivity of the infrared reflecting film: poor in Sungate glass and excellent in the proposed semimetal coating. The second difference is in the radiative cooling ability of the outermost surfaces. Glass has good thermal emissivity in the infrared, however, being a broad-band emitter, its radiative cooling is not as efficient as that of the proposed narrow-band emitters, such as $SiO_xN_y$. Transmission characteristics of a multilayer film is angle dependent, whereas that of a two-layer film is not. The new coating is much more economical and less expensive than the vulnerable film stack which requires encapsulation through a complicated glass laminating process. Since $SiOxNy$ is harder than ordinary glass, this film can serve as a protective coating against scratches. The proposed coatings could also be applied to existing automobiles without glazing replacement. One method of application is spraying the window with a liquid comprising a binder in which are dispersed tiny particles of the semimetal and the selective emissivity material.

Another technique for fabricating the coating is to sputter the thin films onto the exterior surface of the vehicle window. Sputtering of thin films is well known. For example, a first film of the semimetal can first be formed on the exterior surface of the window glass, to a thickness of several microns, say in the range of one-half to tens of microns. Then a second layer is sputtered onto the first layer, the second layer being the selective emissivity material, such as silicon-oxy-nitride, to a thickness on the order of a micron. The thickness of the films is limited by the transparency requirement.

Second Coating Embodiment

A coating in accordance with the teachings of the present invention need not be formed of two films, one of the semimetal, the other of the selective emissivity material. The coating may be a single layer comprising both the semimetal and the selective emissivity material. FIG. 9 shows, in simplified form, such a single layer coating 30 comprising both the semimetal and the selective emissivity material applied to an external surface 32, such as a window surface. Such a coating may be fabricated as a thin film applied to a window surface by a sputtering technique applying both the semimetal and the selective emissivity material interspersed in a substantially uniform manner over the window surface. Alternatively, the coating may be applied to the window or building structure surface in the form of a spray comprising tiny particles of the semimetal and the selective emissivity material, suspended in a liquid binder such as alcohol or other suitable binder liquid, such as ether. Once sprayed onto the surface, e.g. from a spray bottle or apparatus, the alcohol evaporates, leaving a thin coating of the semimetal and selective emissivity particles on the surface of the window or building structure.

Another technique for applying the coating is to dip the window or building structural element in a bath comprising tiny particles of the semimetal and the selective emissivity material, suspended in a liquid binder, such as alcohol. As the window is removed from the bath, a thin coating of the bath fluid adheres to the surfaces of the window, and the binder evaporates, leaving the coating of the semimetal and selective emissivity particles covering the surfaces of the window or building structural elements.

It is presently believed that particle sizes in the ten to one hundred micron range would be suitable for the application of the coating. The particles in the required size range can be obtained with conventional methods of grinding and meshing.

It is believed that the number of particles $n_d$ per unit area in the particle layer should be defined by Equation 2:

$$n_d l \geq 1/\sigma_{abs} \qquad (2)$$

where l is the thickness of the particle layer and $\sigma_{abs}$ is the absorption coefficient of the particles at the long IR wavelengths. One crude estimate of the density of particles is given by Equation (3):

$$n_d l \geq (cmw)/(4\pi e^2) \quad (3)$$

where c is the speed of light, m is the average particle mass, e is the electron charge, and w is the absorption line width in sec$^{-1}$.

Third Embodiment

Figure 10:
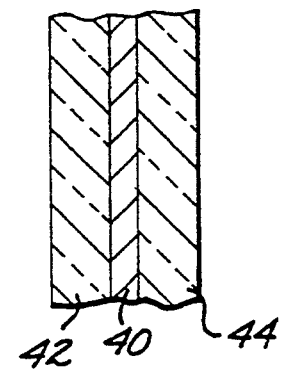
FIG. 10 shows a coating in accordance with the invention which is sandwiched between two singlets comprising a laminated window structure.

Another embodiment of a coating in accordance with the invention is employed with windows which comprise two window singlets which are laminated together to form a composite window structure. Such laminated window structures are commonly used for vehicle windshields, for example. In this embodiment, the coating 40 in accordance with the invention is sandwiched between the two window singlets 42 and 44, as shown in FIG. 10. The coating 40 may be fabricated as either the two distinct layer coating as described with respect to the first embodiment, or as the single layer coating described with respect to the second embodiment. The coating 40 is protected from damage by exposure to the atmosphere by the respective window singlets 42 and 44.

Fourth Embodiment

Figure 11:
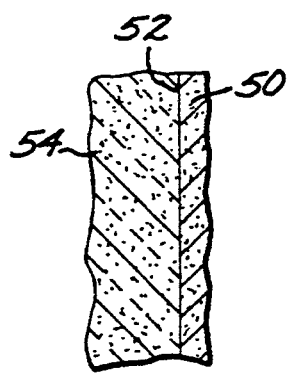
FIG. 11 shows a paint coating in accordance with the invention which is applied to an external surface of a building structural element.

Another alternative embodiment of the invention is a paint for building structures, as generally illustrated in FIG. 11, wherein the semimetal and selective emissivity material particles are mixed into and suspended within the otherwise conventional paint, to be applied to form a coating 50 to an external surface 52 of the building structure 54 exposed to solar radiation. Here again, the suspended particles of the semimetal will reflect infrared radiation, and the particles of the selective emissivity material permit radiative cooling to occur.

Fifth Embodiment

Figure 12:
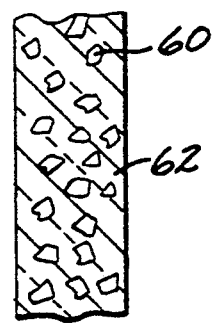
FIG. 12 illustrates a window wherein tiny particles of a semimetal and a selective emissivity material in accordance with the invention are embedded within the glass of a window.

In a further embodiment, the particles of the semimetal and selective emissivity material are not applied as a coating to the window or building structural element, but are dispersed or suspended within the window glass or structural element. Thus for the window, tiny particles of the semimetal and the selective emissivity material are added to the molten glass as the window is being formed. A window formed by such a technique is illustrated in FIG. 12, where the particles 60 represent the suspended particles of the two materials, the semimetal and the selective emissivity material suspended within the glass comprising the window 62.

Sixth Embodiment

In each of the foregoing embodiments of the invention, a semimetal has been employed as a constituent part of the coatings to provide a mechanism for reflecting incident solar radiation in the infrared spectrum. However, for some applications, the semimetal may not be needed or used. In accordance with another aspect of the invention, a coating is provided which comprises the selective emissivity material but which does not include the semimetal material. Thus, for example, the coating 14 of the first embodiment would be modified to omit the layer 16 of the semimetal material, as illustrated in FIG. 13, where the coating 14' consists of a layer of the selective emissivity material. The coatings of the second and third embodiments is modified to omit the particles of the semimetal. The paint of the fourth embodiment is modified to omit the particles of the semimetal. The particles of the semimetal are omitted from the glass of the fifth embodiment. In each case, the modified coatings and paint include the selective emissivity material to provide a mechanism for radiative cooling.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. An apparatus for reducing the solar heat load inside an automobile and effecting radiative cooling, the automobile having an interior and an exterior comprising:

a window element said element having an exterior side facing outside the automobile and an interior side; and a coating for reducing the solar heat load of the interior of the automobile and adapted to coat said element, said coating comprising;

a semimetal film disposed on the exterior side of said element and which is substantially transparent to visible light, and reflective of energy in the near infrared spectral region; and a thin film of a selective emissivity material disposed on said semimetal film and characterized by its transparency in the visible light spectrum and the film having a high emissivity level substantially equal to one in the far infrared wavelength spectrum between 8-13 $\mu$m and in the visible spectrum, and a low emissivity substantially equal to zero outside said far infrared spectrum between 8-13 $\mu$m and said visible spectrum, wherein said semimetal film serves to reflect incident solar radiation in the infrared spectrum out into a space outside of the automobile and thereby reduce the solar heat load on the interior of the automobile, and said selective high emissivity material serves to radiate the far infrared energy between 8-13 $\mu$m emitted by the automobile away from the automobile through the atmosphere to outer space, thereby providing a mechanism for radiative cooling of the interior of the automobile.

2. The apparatus of claim 1 wherein said semimetal is characterized by a decline in reflectivity from near one to substantially below one in the 650-800 $\mu$m spectral region.

3. An apparatus for reducing the solar heat load inside a automobile, comprising:

a window element said element having an exterior side facing outside the automobile and an interior side; and a coating for reducing the solar heat lead inside the automobile and adapted to coat said element, said coating comprising;

a semimetal film disposed on the exterior side of said element and which is substantially transparent to visible light, and reflective of energy in the near infrared spectral region wherein said semimetal is selected from the group consisting of LAB$_6$, LaTe, and SbS$_3$ and combinations thereof; and a thin film of a selective emissivity material disposed on said semimetal film and characterized by its transparency in the visible light spectrum and an emissivity substantially equal to one in the far infrared wavelength spectrum between 8-13 $\mu$m, wherein said semimetal film serves to reflect incident solar radiation in the infrared spectrum and thereby reduce the solar heat load on the vehicle, and said selective emissivity material serves to radiate the far infrared energy between 8-13 μm emitted by the vehicle away to space outside the vehicle, thereby providing a mechanism for radiative cooling of the interior of the vehicle.

4. The apparatus of claim 1 wherein said selective emissivity material is silicon-oxi-nitride.

5. The apparatus of claim 1 wherein said semimetal is characterized by a decline in reflectivity from near one to substantially below one in the 650-800 μm spectral region.

6. The apparatus of claim 1 wherein said element is a laminated structure comprising first and second members, and wherein said semimetal film and said selective emissivity material film are sandwiched between said first and second members.

7. A coating for interior temperature reduction of a space enclosed by structural elements and adapted to coat said structural elements, said coating, comprising a selective emissivity material characterized by a high thermal emissivity level substantially equal to one for radiation in the 8-13 μm wavelength region, and by a low thermal emissivity level substantially equal to zero for radiation in near infrared spectra, said material responsive to heat energy radiated from said enclosed space to radiate energy in the 8-13 μm spectral region for providing radiative cooling of said enclosed space.

8. The coating of claim 7 wherein said coating comprises a paint adapted to coat a building structure, and is further characterized in that said material is in the form of particles dispersed within said paint.

9. The coating of claim 8 wherein said coating further comprises particles of a semimetal dispersed within said paint, said semimetal being substantially transparent to visible light and reflective of energy in the near infrared spectral region.

10. The coating of claim 7 wherein said selective emissivity material comprises silicon-oxy-nitride.

11. The coating of claim 7 further comprising a semimetal which is reflective of energy in the near infrared spectral region.

12. The coating of claim 11 wherein said coating is adapted to coat a window.

13. The coating of claim 11 wherein said material is dispersed in said semimetal.

14. An apparatus for reducing the solar heat load inside a vehicle, the vehicle having an interior and an exterior, comprising:
a window element said element having an exterior side facing outside the automobile and an interior side; and
a coating applied to said window element for reducing the solar heat load of the interior of the vehicle, said coating comprising a selective emissivity material characterized by its transparency in the visible light spectrum and a high emissivity level substantially equal to one in the far infrared wavelength spectrum between 8-13 μm and in the visible spectrum, and a low emissivity substantially equal to zero outside said far infrared spectrum between 8-13 μm and said visible spectrum, wherein said selective high emissivity material serves to radiate the far infrared energy between 8-13 μm emitted by the automobile away through the atmosphere to outer space, thereby providing a means for radiative cooling of the interior of the automobile.

15. The apparatus of claim 14 further comprising a semimetal film disposed on the exterior side of said element and which is substantially transparent to visible light, and reflective of energy in the near infrared spectral region, said semimetal film reflecting incident solar radiation in the infrared spectrum out into a space outside of the vehicle and thereby reduce the solar heat load on the interior of the vehicle.

16. The apparatus of claim 15 wherein said semimetal is characterized by a decline in reflectivity from near one to substantially below one in the 650-800 μm spectral region.

17. The apparatus of claim 14 wherein said selective emissivity material comprises silicon-oxy-nitride.

18. The apparatus of claim 14 wherein said window element is a laminated structure comprising first and second transparent members, and wherein said coating is applied as a thin film comprising said selective thermal emissivity material sandwiched between said first and second members.

* * * * *